350-96.1 SR

XR 3,432,676

SEARCH ROOM

March 11, 1969 A. F. LINDBERG 3,432,676

HOUSING FOR LIGHT SENSITIVE DEVICES COMPRISING LIGHT-CONDUCTING TUBES IN TRANSPARENT PLASTIC SUPPORT BLOCK

SUBSTITUTE FOR MISSING XR

Filed Oct. 5, 1966

INVENTOR
ARTHUR F. LINDBERG

BY R. C. Terry

ATTORNEY

United States Patent Office 3,432,676

Patented Mar. 11, 1969

3,432,676
HOUSING FOR LIGHT SENSITIVE DEVICES COMPRISING LIGHT-CONDUCTING TUBES IN TRANSPARENT PLASTIC SUPPORT BLOCK

Arthur F. Lindberg, Chicago, Ill., assignor to Teletype Corporation, Skokie, Ill., a corporation of Delaware Filed Oct. 5, 1966, Ser. No. 584,557
U.S. Cl. 250—239 13 Claims
Int. Cl. H01j 5/02

ABSTRACT OF THE DISCLOSURE

A housing for light sensitive devices including a support block formed from a transparent material and having a plurality of parallel, blind holes formed in it; a plurality of hollow, blackened tubes each mounted in one of the blind holes in the support block and extending from the block a predetermined distance; a gasket having a thickness greater than the predetermined distance and having a plurality of holes formed in it mounted on the support block with each of the tubes extending into one of the holes in the gasket; a plurality of light sensitive devices mounted on the gasket and each extending into one of the holes therein; a printed circuit board attached to the photosensitive devices for supporting the devices in engagement with the gasket; a second gasket mounted on the printed circuit board; a saddle member mounted on the second gasket, and a spring clip mounted on the saddle member and attached to the support block for joining the components of the housing into a unitary structure.

This invention relates to housings for light sensitive devices and more particularly to support assemblies for photoelectric document readers.

In the construction of photoelectric document readers it is desirable to mount the light sensitive elements of the reader a considerable distance away from the document to be read in order to take maximum advantage of the light dissipation caused by an imperforate portion of a document coming between a light source and the light sensitive elements. Remote mounting of the light sensitive elements of the reader tends, however, to increase the likelihood of oil, lint or other contaminants coming between the light source and the light sensitive elements and thereby causing malfunctions of the reader. It has been found that by providing a sealed housing for the light sensitive elements of a photoelectric reader the problems of remote mounting and freedom from contamination can be simultaneously solved.

Accordingly, a primary object of this invention is to provide an improved housing for light sensitive devices.

Another object of this invention is to provide a completely sealed support structure for the light sensitive elements of a photoelectric reader in which the light sensitive elements are positioned at a point remote from the documents to be read.

In the preferred embodiment of the invention these and other objects are achieved by providing a transparent support block having a plurality of blind holes formed in it. A blackened tube is mounted in each of the holes in the block and extends therefrom into and partially through a gasket. A plurality of light sensitive elements are mounted on a circuit card which is in turn mounted on the gasket so that the light sensitive elements extends into and partially through the gasket in alignment with the tubes. Thus, the gasket serves both to support the light sensitive elements and to seal the light-conducting channel against the entry of contaminants.

A more complete understanding of the invention may be had by referring to the following detailed description when taken in conjunction with the drawings wherein.

Figures 1, 2, 3, 4, 5, 6:
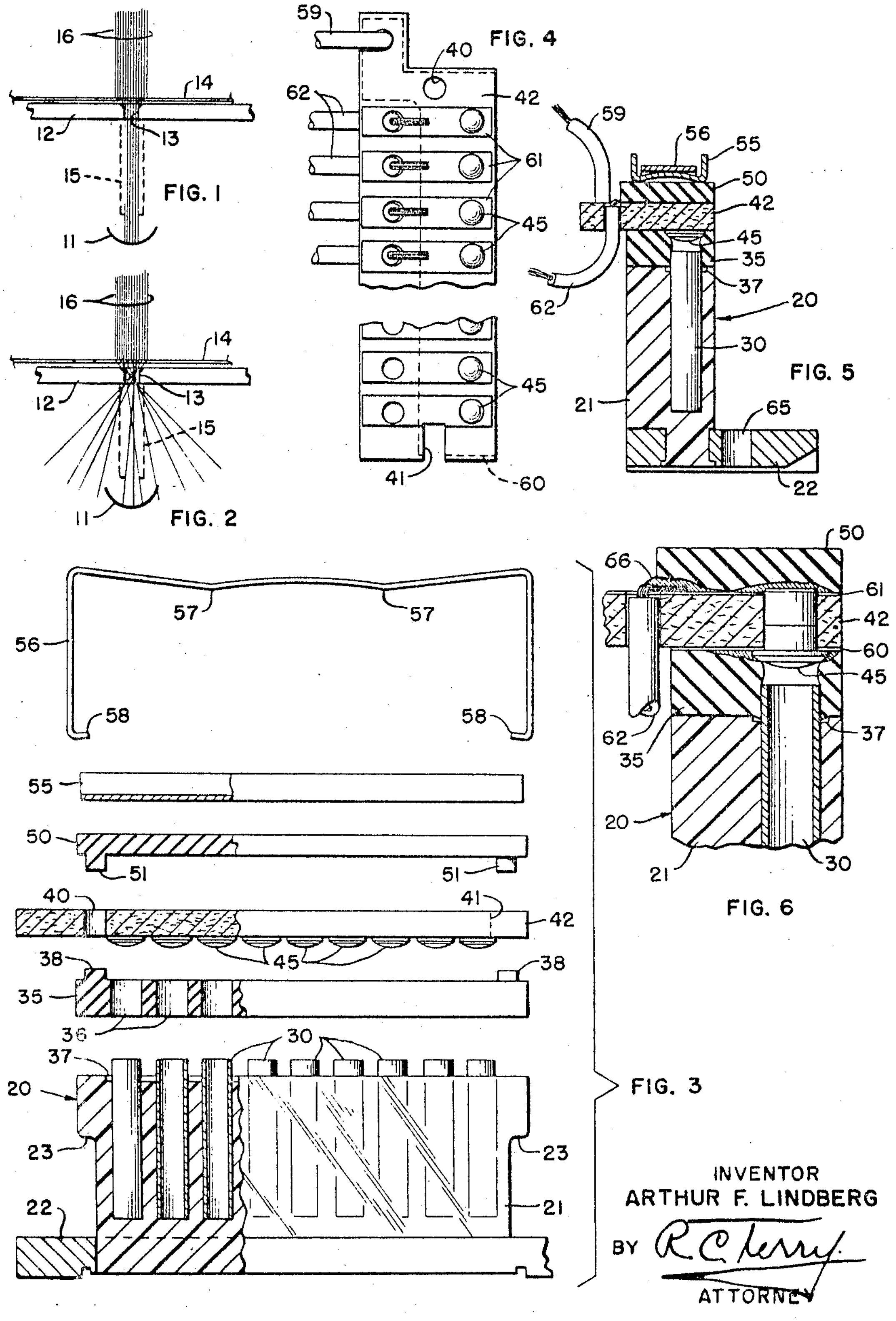
FIGS. 1 and 2 are schematic illustrations of the operation of a photoelectric reader.
FIG. 3 is an exploded view of a photoelectric reader employing the present invention.
FIG. 4 is a top view of the circuit card employed in the reader shown in FIG. 3.
FIG. 5 is a sectional view of an assembled photoelectric reader employing the present invention.
FIG. 6 is an enlarged sectional view of the upper portion of the device shown in FIG. 5.

Referring now to the drawings and particularly to FIGS. 1 and 2 there is schematically illustrated a photoelectric document reader comprised of a light sensitive device 11, a reading plate 12 having a reading hole 13 formed through it, a document 14 to be read and a blackened, light-conducting tube 15 shown in phantom lines in the drawing. Collimated light comprised of a plurality of parallel rays 16 is directed from a light source (not shown) onto the document 14. If a hole is present in the document 14 and is in alignment with the hole 13 in the plate 12, the collimated light passes through the document 14 and through the hole 13 into the light-conducting tube 15 and then passes through the light-conducting tube 15 to the light sensitive device 11 thereby rendering the light sensitive device 11 conductive. This condition is noted by appropriate circuitry so that the presence of a hole in the document 14 is noted.

A long known but still little recognized fact in the art of photoelectric document readers is that the cards and tapes which are commonly read by such devices are not opaque but are instead translucent and thus act as a secondary light source when struck by light. See, for example, Potts Patent No. 2,177,077, granted Oct. 24, 1939. Thus, as is illustrated in FIG. 2 of the drawings, when collimated light in the form of parallel rays 16 strikes an imperforate portion of the document 14, the light is not blocked but is instead reradiated by the document 14 in a diverse pattern. This reradiation in combination with the ambient light can cause enough light to strike the light sensitive device 11 to render the light sensiitve device 11 conductive thus causing an erroneous reading. Also, the divergence of the light reradiated by the document 14 may cause adjacent light sensitive devices 11 to be rendered conductive, thereby causing more than one error.

To overcome the problem of reradiation by the document 14 it is helpful to place the light sensitive device 11 as far away from the hole 13 in the plate 12 as is practical, thereby taking full advantage of the divergence caused in the light by the document 14. It is also very helpful to place a blackened tube, such as the light-conducting tube 15, in line with the hole 13 in the plate 12 so that the divergent light which is reradiated by the document 14 is absorbed and is not spread to adjacent light sensitive devices 11.

Referring now to FIG. 3 there is shown a photoelectric reader 20 embodying the concepts discussed in conjunction in FIGS. 1 and 2. A transparent plastic support block 21 is molded directly into a metal plate member 22 and serves as a support for the various components of the device. The transparent support block 21 has a plurality of blind holes extending from its top (FIG. 3) substantially through it and has a pair of ears 23 formed on its sides. In normal use a document to be read is positioned under the plate 22 and collimated light from a source (not shown) is directed onto the document and is passed through the document into the support block 21.

Mounted in the blind holes of the support block 21 and extending therefrom are a plurality of blackened, light-conducting tubes 30. As explained in conjunction with FIGS. 1 and 2 the function of the light-conducting tubes 30 is to pass directly light which comes from a light source (not shown) through a hole in a document being read and to absorb the divergent light which is reradiated by imperforate portions of a document being read.

Mounted on top of the support block 21 is a gasket 35 which is formed from a soft rubber-like material. The gasket 35 has a plurality of holes 36 formed through it. When the gasket 35 is mounted on the support block 21 the holes 36 are positioned in engagement with the light-conducting tubes 30 so that the tubes 30 extend into and partially through the holes 36. A tight seal between the gasket 35 and the light-conducting tubes 30 is assured by a recessed portion 37 formed in the top of the block 21 which allows the gasket 35 to deform downwardly (FIG. 6) around the tubes 30.

The gasket 35 has a pair of locating projections 38 formed on its upper surface. The projections 38 are engaged with a locating hole 40 and a locating slot 41 in opposite ends of a circuit card or board 42. The circuit board 42 supports a plurality of light sensitive devices 45 and provides input and output connections for the devices 45. The function of the locating pins 38 on the gasket 35 and the locating hole 40 and the locating slot 41 on the card 42 is to align the light sensitive devices 45 with the holes 36 in the gasket 35 so that the light sensitive devices 45 extend into and partially through the holes 36.

Mounted above the circuit board 42 is a second gasket 50 formed from a soft rubber-like material. The gasket 50 is provided with a pair of locating pins 51 which extend into the hole 40 and the slot 41 in the circuit board 52 to locate the gasket 50 with respect to the board 42. Mounted above the gasket 50 is a saddle member 55 formed from steel or the like which engages the gasket 50 and serves to force the circuit board 42 into engagement with the gasket 35. A spring clip 56 formed from spring steel or the like is provided for securing the entire assembly into a unitary structure.

The clip 56 is provided with a pair of pressure points 57 which engage the saddle member 55 and cause a uniform pressure to be applied by the saddle member 55 to the circuit card 42 along its entire length. The clip 56 is provided with a pair of fingers 58 for engaging the ears 23 on the support block 21 so that the entire structure is joined into a unitary assembly.

In FIG. 4 the details of the circuit board 42, including the locating hole 40 and the locating slot 41, are shown. A lead-in wire 59 is provided for supplying a common potential to all of the light sensitive devices 45. The wire 59 passes through a hole in the board 42 and is soldered to a common electrode 60 which is attached to the bottom side of the board 42 by printed circuit techniques and which is shown in hidden lines in the drawing.

Mounted on top of the board 42 are a plurality of individual electrodes 61 which are electrically connected to the light sensitive devices 45 and which are in turn soldered to a plurality of individual output leads 62 which extend through holes in the circuit board 42 to a remote point. Thus, when light strikes the light sensitive devices 45 and the devices are rendered conductive the common potential which is applied to the common electrode 60 by the wire 59 is passed through the circuit board 42 by the light sensitive devices 45 to the individual electrodes 61 and from the electrodes 61 to the wires 62. When no light strikes the light sensitive devices 45 to the common potential applied by the wire 59 is disconnected from the electrodes 61 and the wires 62 because the light sensitive devices 45 are nonconductive.

Referring now to FIGS. 5 and 6 the details of the devices shown in FIG. 3 in an assembled state are shown. In particular the plate 22 to which the support block 21 is molded is shown as having a hole 65 extending through it. In actual practice the plate 22 is the guide plate of a document perforator and the punch pins of the perforator extend into the hole 65. The support assembly described herein allows the photoelectric reader 20 to be mounted in the position on the perforator which is next adjacent to the position whereat the document is actually recorded. The mounting of the reader 20 in this position allows the recorded documents to be quickly checked and any errors in the documents noted.

Referring now particularly to FIG. 6 it will be noted that the solder 66 which connects the wires 62 to the individual electrodes 61 forms an uneven surface on top of the circuit board 42. This unevenness is absorbed by the gasket 50 so that uniform pressure is applied to the circuit board 42 by the saddle member 55 and the spring clip 56.

It should also be noted that the portion of the light sensitive devices 45 which extend below the circuit board 42 are constructed with a chamfered portion 70. This chamfered portion 70 engages the gasket 35 and forms a seal with the gasket 35 so that no oil or other contaminants can enter either the blind holes in the support block 21 or the light-conducting tubes 30. The seal between the gasket 35 and the tubes 30 in the area of the recess 37 is also shown in detail. Thus, it should be understood that the combination of the chamfered portions 70 of the light sensitive devices 45, the gasket 35, the recess 37 in the block 21 and the fact that the holes in the block 21 are blind holes all serve to prevent contaminants from entering the light path which extends from the bottom of the plate 22 to the light sensitive devices 45 and thus assures that the light will have a free path of travel.

Although only one embodiment of the invention is shown in the drawing and described in the foregoing specification, it will be understood that invention is not limited to the specific embodiment described, but is capable of modification and rearrangement and substitution of parts and elements without departing from the spirit of the invention.

What is claimed is:

1. A light sensitive device support assembly including:
   a transparent support block having a plurality of blind, light-conducting holes formed in it;
   a plurality of light sensitive devices each positioned in registry with one of the holes in the support block; and
   means for effecting a seal between the light sensitive devices and the support block to prevent contaminants from entering the holes in the support block.

2. The support assembly according to claim 1 wherein the means for effecting a seal is a gasket having a plurality of holes formed through it mounted between the support block and the light sensitive devices with the holes in the gasket in registry with the holes in the support and with the light sensitive devices extending into and partially through the holes in the gasket.

3. The support assembly according to claim 2 further including a plurality of blackened, light-conducting tubes one mounted in each of the holes in the support block and each extending into and partially through the holes in the gasket so that light entering the support block passes through the tubes and through the holes in the gasket to the light sensitive devices.

4. The support assembly according to claim 2 wherein the light sensitive devices are all mounted on a circuit board and further including means for attaching the circuit board and the gasket to the support block.

5. In a photoelectric apparatus of the type having a transparent support block including a plurality of light transmitting paths and a plurality of light sensitive devices mounted on the support block in alignment with the light conducting paths, the combination with the support block of a plurality of tubes mounted in the support block and extending therefrom into juxtaposition with the light sensitive devices and a gasket mounted on the support block encircling the portions of the tubes which extend from the block for forming a seal between the light sensitive devices and the tubes.

6. The combination according to the claim 5 wherein the light conducting paths of the support block are blind holes in which the tubes are mounted so that the gasket and the support block completely seal the light conducting paths thereby preventing contaminants from entering the paths.

7. The combination according to claim 5 wherein the light sensitive devices are mounted on a supporting member which is mounted on the gasket, the combination further including cooperating means on the gasket and the supporting member for maintaining the light sensitive devices in juxtaposition with the tubes.

8. A support assembly for a light sensitive device including:

a support block;

a gasket mounted on the support block and having at least one hole formed in it;

at least one light conducting tube mounted in the support block in alignment with the hole in the gasket and extending therefrom into engagement with the gasket; and a light sensitive assembly positioned on the gasket in alignment with the tube and extending into the hole in the gasket so that light entering the support block passes through the light conducting tube and through the gasket to the light sensitive assembly.

9. The support assembly according to claim 8 wherein the light sensitive assembly includes a supporting member and wherein the support assembly includes cooperating locating means on the supporting member and on the gasket for maintaining the light sensitive assembly in alignment with the tube.

10. A housing for light sensitive devices including:

a plurality of light sensitive devices;

a gasket positioned in engagement with the light sensitive devices and having holes formed through it in alignment with the light sensitive devices; and a plurality of tubes positioned in engagement with the gasket in alignment with the holes therein for passing light to the light sensitive devices.

11. The housing for light sensitive devices according to claim 10 wherein the tubes extend into the holes in the gasket.

12. The housing for light sensitive devices according to claim 11 further including a support block having the tubes mounted in it and extending from it into the holes in the gasket.

13. The housing for light sensitive devices according to claim 12 wherein the support block has a plurality of blind holes formed in it and wherein the tubes are positioned in the holes.

References Cited

UNITED STATES PATENTS

| | | | |
|---|---|---|---|
| 1,848,814 | 3/1932 | Allen | 350—319 |
| 2,907,886 | 10/1959 | Willard et al. | 250—213 |
| 2,916,624 | 12/1959 | Angel et al. | 250—219 |
| 3,036,765 | 5/1962 | Jones et al. | 250—227 X |
| 3,042,806 | 7/1962 | Lubin | 250—239 X |
| 3,311,749 | 3/1967 | Briggs | 250—227 X |
| 3,360,657 | 12/1967 | Schlesinger et al. | 250—227 |

JAMES W. LAWRENCE, *Primary Examiner.*

V. LAFRANCHI, *Assistant Examiner.*

U.S. Cl. X.R.

350—319; 250—220, 227, 219; 235—61.11